United States Patent [19]

Carlin

[11] 4,323,219
[45] Apr. 6, 1982

[54] AUTOMATIC HOSE CLAMP

[76] Inventor: Jack M. Carlin, RFD Box 135, Del Mar, Calif. 92014

[21] Appl. No.: 151,317

[22] Filed: May 19, 1980

[51] Int. Cl.³ ............................................. F16L 55/14
[52] U.S. Cl. ....................................... 251/5; 137/467; 251/9
[58] Field of Search .................... 137/467; 251/5, 6, 4, 251/9

[56] References Cited

U.S. PATENT DOCUMENTS

| | | | |
|---|---|---|---|
| 1,330,523 | 2/1920 | Evitts | 251/6 |
| 2,483,954 | 10/1949 | Weiss | 251/5 X |
| 4,268,004 | 5/1981 | Gatin | 251/5 |

Primary Examiner—Robert G. Nilson
Attorney, Agent, or Firm—Ralph S. Branscomb

[57] ABSTRACT

An automatic hose clamp is provided particularly for use with fire hoses, and is manually engaged on a fire hose which is subsequently attached to a fire hydrant, there being a trickle flow allowed past the clamp so that the downstream end of the hose, if unconnected to anything, will dissipate this trickle, but upon being connected to the fire truck pumping unit the downstream end fills and exerts back pressure on a specially oriented plate in the clamp, finally resulting in the popping free of the clamp due to the expansion of the hose against the plate so that water is free to flow at this point unobstructed by the clamp. Previously a manually operated clamp was used requiring the presence of a fireman to turn a wheel or otherwise operate the valve actuator to release the clamp once the hose had been connected to the main pump.

12 Claims, 17 Drawing Figures

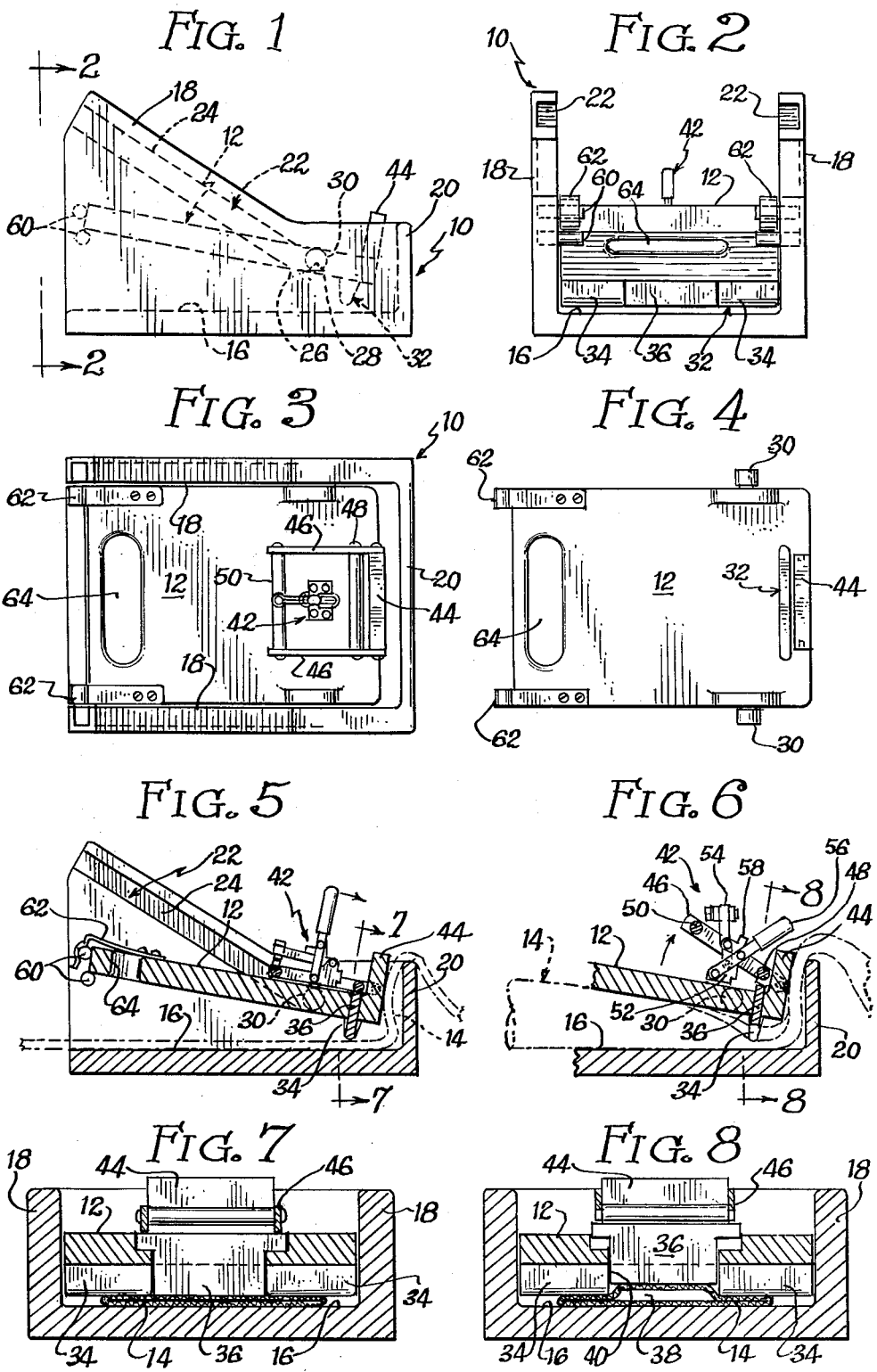

U.S. Patent  Apr. 6, 1982  Sheet 3 of 3  4,323,219
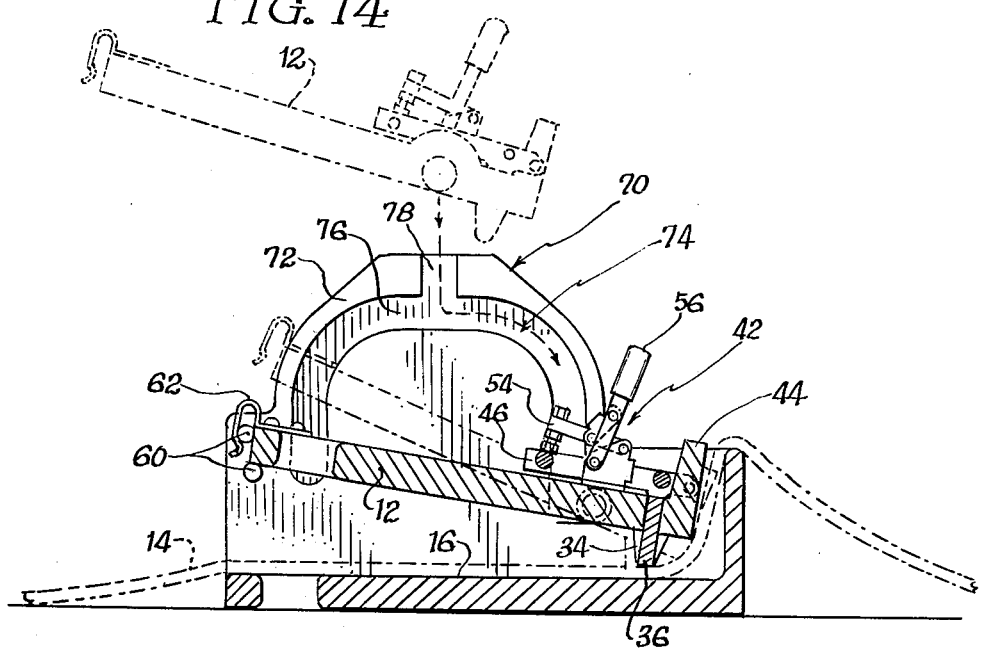
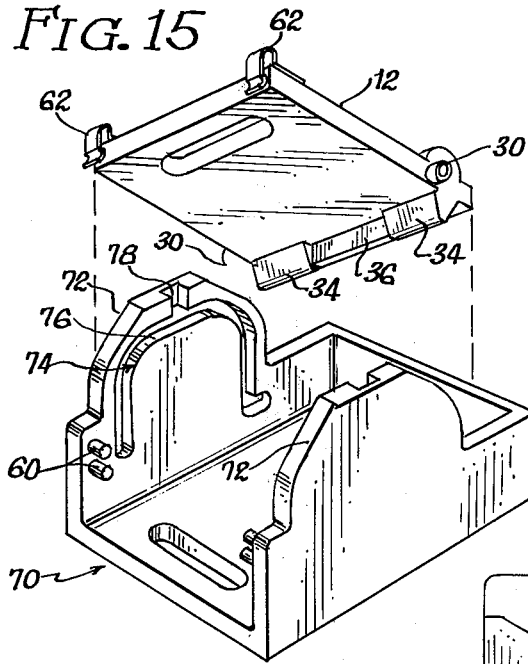
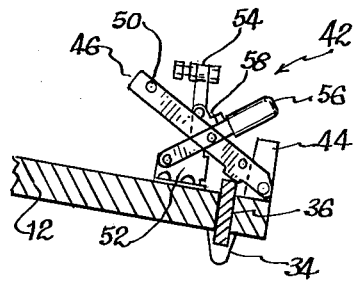
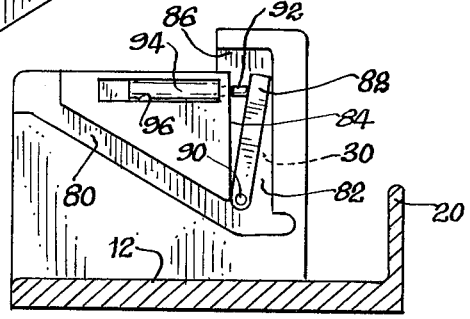

AUTOMATIC HOSE CLAMP

BACKGROUND OF THE INVENTION

The instant automatic clamp is in the field of fire fighting equipment, and its utility requires a brief explanation of a portion of fire fighting technique. When a fire truck, having been called to a blaze, approaches the burning property, a fireman disembarks from the fire truck with the end of the main feeder hose which will connect the fire hydrant to the main fire truck pumping inlet. This hose is coiled in the truck bed and comes in lengths of 50' or more, all connected together. The fireman connects his end of the hose to the fire hydrant as the truck drives on to the fire site. As soon as the fire truck arrives at its destination, a fireman on board the truck puts a hose clamp on the on board end of the main supply hose to permit the hydrant man to open the hydrant. Once the hose clamp is secure, the on board portion of the hose is uncoupled at the appropriate length and then coupled into the pump inlet. At this point the hose clamp may be released.

When it is released, often, because of the air captured on the upstream side of the hose clamp, the rushing water hits the clamp and subsequently the pump with a great deal of force. Additional disadvantages of this approach lie in requiring a fireman to release the hose clamp, which is a task requiring critically needed time and a great deal of exertion by the fireman in charge. Also, hose clamps of the type conventionally used are quite heavy and may be awkward to operate.

SUMMARY OF THE INVENTION

The present invention avoids the above-stated problems by providing an automatic hose clamp which, without the twisting of any clamping wheel, can be easily slipped in place around the flaccid hose and ignored from that time onward. The clamp automatically clamps tighter and tighter as the fire hydrant is opened, but permits a slight trickling of fluid so that the air is purged from the upstream lengths of the hose. The arrangement of the valve is such that it will remain tightly closed as long as the downstream end of the hose is flaccid. However, once the downstream is connected into the pump inlet, the trickle of water permitted to pass the hose clamp quickly fills the downstream end, and as the hose gets more and more turgid, that portion of the hose just downstream of the hose clamp expands against a specially designed foot portion of the hose clamp plate, springing it free of the hose and opening same to permit free flow of the water there through.

It can thus be seen that by utilization of this clamp, not only is it much quicker and easier to clamp the hose in the first place, but it also eliminates the problem of trapped air in the line and frees firemen from further worry about the operation of the clamp.

BRIEF DESCRIPTION OF THE DRAWINGS

FIG. 1 is a side elevation view of the clamp;
FIG. 2 is a view taken along line 2—2 of FIG. 1;
FIG. 3 is a top elevation view of the clamp;
FIG. 4 is a bottom elevation view of the hose clamp plate;
FIG. 5 is a vertical section taken longitudinally of the clamp;
FIG. 6 is a section showing the gate actuator mechanism of the clamp plate in detail;
FIG. 7 is a section taken along lines 7—7 of FIG. 5;
FIG. 8 is a section taken along line 8—8 of FIG. 6;
FIG. 9, engaging the hose;
FIG. 10, hose engaged, hose flaccid;
FIG. 11, hose engaged, upstream portion turgid, plate in cocked position;
FIG. 12, clamp has been actuated;
FIG. 13, downstream end has filled, opening the clamp.
FIG. 14 is a section of a modification of the hose clamp;
FIG. 15 is an exploded perspective of the clamp of FIG. 14;
FIG. 16 is a detail of the clamp gate actuation mechanism.
FIG. 17 is a side elevation view of another modification.

DETAILED DESCRIPTION OF THE PREFERRED EMBODIMENTS

Figure 9:
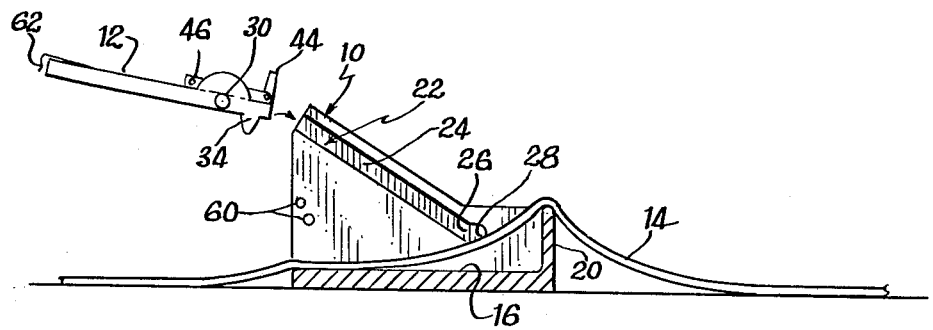
FIGS. 9-13 show the sequential operation of the clamp as follows.

The hose clamping assembly comprises two basic, separable parts, the casing 10 of FIGS. 1 through 13 and the clamping plate 12. The casing and the plate together capture the fire hose 14 there between. The casing is provided with a floor 16 onto which the flaccid hose is laid, a pair of upright parallel side walls 18 and a downstream wall or ramp 20, the purpose of which becomes apparent hereinafter. A pair of opposed slots 22 are defined in the side walls 18. These slots have an upstream portion 24, an elbow 26, and a downstream link 28.

The clamping plate is provided with a pair of opposed lateral trunnions 30, preferably with cylindrical bearings, which engage into the opposed slots 22 after the hose has been laid into the casing. Note for this purpose the slots are open ended at their upstream end.

When the hose clamp is used, the hose, which lies quite flat, is put in the casing as shown in FIG. 9 and the clamp plate 12 inserted into the slots 22, again as shown in that figure.

The clamp plate mounts other structure, including a clamping bar 32 which actually presses against the hose to clamp same. In the preferred embodiment, the clamp bar is provided with two rigid end portions 34 and a central, displaceable gate 36 which may be moved relative to the end portions 34 as shown in FIG. 8 to allow a partial opening of the hose at 38 to permit a necessary trickle of water into the downstream portion.

This gate is journaled in a slot 40 through the body of the plate and is controlled by a gate actuator 42, comprised in the illustrated embodiment of a number of levers, aranged as follows.

At the lower end of the clamp plate 12 is an upturned foot 44 and on the inside of this foot are pivoted a pair of side arms 46 best seen in FIGS. 3 and 6. These side arms mount therebetween, very close to their pivoted ends, the gate 36 which is pivoted between them at 48. The gate has enough play in its housing slot to permit this dual pivot structure.

A bar 50 spans the other ends of the side arms 46 and this bar is in turn held down by an over-the-center lock mechanism comprising bracket 52 mounted to the plate, clamp 54 pivoted to the bracket and having a tip which engages the bar 50, actuating lever 56 and pivoting links 58 so that when the actuating lever is pushed to the upstream side as shown in FIG. 5 the gate is locked in its downward position, cutting off all flow through the hose 14. However, a very lightweight flip of the finger can displace the actuating lever to the downstream end, thus opening the gate as shown in FIGS. 6 and 8 to permit a trickling of water into the downstream portion of the hose.

In order to maintain the two parts of the clamp together both in transit and while they are on the hose but before the hose is opened, two opposed pairs of retaining pins 60 project from the upstream ends of the sidewalls 18 and the clamp plate is latched into position by spring latches 62. While in this position, the clamp can be carried around by the handle defined by the opening 64 in the casing.

Figure 10:
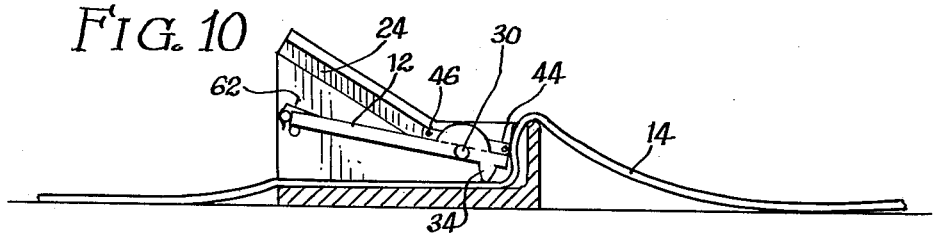

Turning to the sequential operation of the clamp, FIG. 9 as already indicated illustrates the laying the hose 14 into the casing 10, and inserting plate 12. FIG. 10 shows the plate mounted in position with the immediately above described latches 62 in place on the retaining pins. In this figure, clearly the hose is flaccid and lies limply in the casing.

Figure 11:
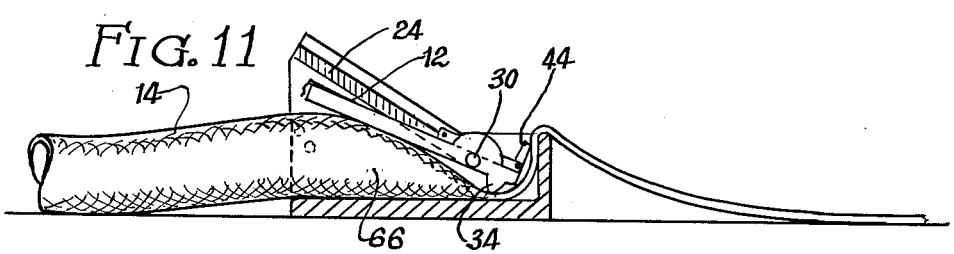

In FIG. 11, the upstream hose portion has been filled by turning on the fire hydrant. As the hydrant fills the upstream portion defining an upstream bulge at 66, the tremendous pressure of the water inside the hose forces the clamp plate 12 forward and upward. Because of the relative angles of the upstream and downstream links of the slots 22, expansion of the upstream bulge 66 tends to lock the clamping plate 12 more firmly in position, raising the upstream end and thereby pivoting the clamping bar 32 more forcefully against the hose clamp. In this fashion the greater the water pressure the more positive is the engagement of the hose to prevent unwanted flow.

Figure 12:
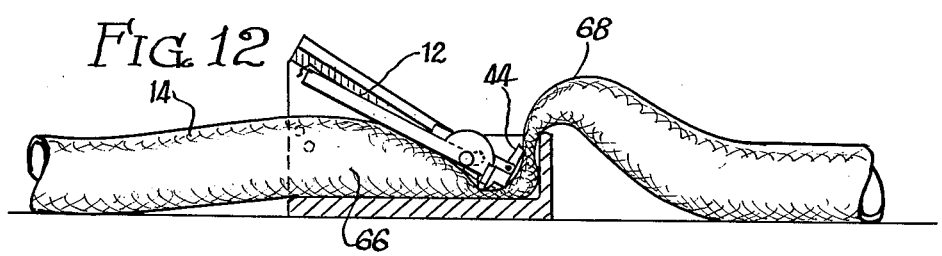
Figure 13:
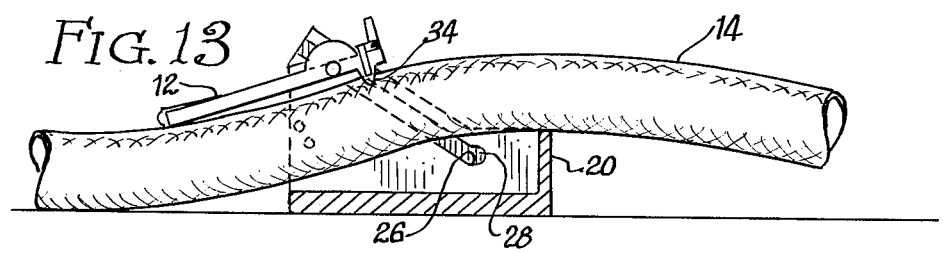

Although it cannot be seen in this figure sequence, sometime subsequent to the position established in FIG. 11 the actuator 42 is flipped open permitting the trickle of water into the downstream portion 68 of the hose as shown in FIG. 12. As this portion expands, the pressure developed is felt between the ramp 20 and the foot 44 of the clamping plate. As this pressure is directed almost parallel to the downstream link 28 of the retaining slots 22, it quickly overcomes the oblique force directed by the upstream bulge 66, as a force vector diagram would easily show. As the trunnions are moved past the slot elbows 26, the full force of the hose expansion is unopposed and the hose clamp flies upward into the position shown in FIG. 13. Actually, were there no restraining means the plate 12 flies free of the casing entirely at a rather high velocity and in fact put a large dent in the inventor's car. Some restraining means clearly would be required for this embodiment, which brings us to the embodiment of FIGS. 14 through 16.

This second embodiment works in exactly the same fashion as the first embodiment, and in fact the clamping plate 12 is identical to that used in the embodiment of FIGS. 1 through 13. The only difference lies in the modified casings 70 whose side walls 72 define variant slots 74, having the elbows 26 and downstream links 28 of the first embodiment but the upstream portions being U-shaped as at 76 with an inlet channel 78 at the top. This embodiment, actually the first one tested, operates in exactly the sequence just described except that in the last step the clamping plate 12 flies through the U-shaped portion 76 of the tracking slots and uses the upstream bulge in the hose as a cushion. This is of some significance, and serves as quite an advantage, because the high hydrant pressure ordinarily experienced coupled with the tremendous forces developed by this pressure exerted over a certain area can be somewhat dangerous. Contrary to the appearance of the second embodiment, in use the plate 12 will not fly out of the inlet channel 78 but will remain such that the trunnions are in the upstream portion of the U-shaped slots.

Another modification is illustrated in FIG. 17 wherein the sidewalls of the plate are grooved to provide an angled loading slot 80, and a vertical riser slot 82 which is lined with urethane or other suitable material 84 to act as a retardant or brake on the trunnion 30. A bumper 86 provided at the end of the track to stop the upward motion of the clamp plate, and may be padded with an elastomeric buffer. In addition, a breaking plate 88 is incorporated which is pivoted at 90 and is held into the riser slot 82 by a pair of spring-returned hydraulic cylinders 94 mounted in retaining slots 96 and the side walls. These hydraulic cylinders have connecting rods 92 bearing against the surface of the brake plate 88 and the pistons inside these cylinders are each provided with a small orifice so that the braking plate is permitted to tilt free of the upwardly moving trunions 30 as the hose is released.

This last mentioned model has proven itself extremely smooth in operation, permitting the trunnioned clamp plate to travel upwardly in a smooth, continuous hydraulic motion controlled by the breaking plate until the entire hose has been cleared.

Modifications of the hose clamp can clearly be developed within the scope and spirit of the apended claims, the principal inventive concepts being the provision of a clamp which is responsive to the expanding downstream hose portion as it fills through a trickle permitted through the hose clamp such that only upon the pressure in the downstream portion of the hose approaching that of the pressure from the upstream portion is the clamp released. It is this utilization of the power of the water itself to actuate both the clamping and subsequently the unclamping of the hose, without requiring any effort on behalf of the fireman, that is the heart of the invention as disclosed and claimed herein.

I claim:
1. An automatic hose clamp for engaging a hose, comprising:
   (a) a clamp assembly for said hose defining upstream and downstream hose portions adjacent thereto and being operable between a first position substantially restricting the flow of fluid through said hose and a second position substantially clear of said hose;
   (b) release means adjacent to the downstream portion of said hose and responsive to the expansive pressure of same as it changes from a flaccid to a turgid state to move said clamp assembly into its second position substantially clear of said hose to permit free flow there through;
   (c) said clamp assembly including a casing defining a hose corridor and a clamp bar movable to compress said hose against said casing in said first position; and
   (d) said bar defining two end portions and a central gate, and including an actuator for displacing said gate relative to said end portions to permit the trickling of a fluid through the hose adjacent said gate.

2. Structure according to claim 1 wherein said actuator has a locked position holding said gate aligned with said end portions, thereby completely clamping said hose closed, and a release position displacing said gate to permit a trickle flow through said hose.

3. Structure according to claim 2 and including a clamp plate integral with said bar and extending along said casing away from said bar adjacent the upstream portion of said hose, said plate having pivotal trunnions extending laterally thereof and engaged in opposed slots in said casings such that expansion of the upstream portion of said hose raises said plate pivotally about said trunnions, simultaneously driving said bar against said hose with increased force, whereby the greater the upstream pressure in said hose the greater the restraining clamping force of said clamping bar.

4. Structure according to claim 3 wherein said casing has a floor supporting said hose and said slots have upstream links descending toward the downstream end of said clamp into elbow portions turning abruptly substantially horizontally to define downstream locking links for said trunnions when the upstream portion of said hose is filled.

5. Structure according to claim 3 wherein said casing defines a downstream upturned ramp and said plate defines an opposed upturned foot such that said ramp and foot capture the downstream portion of said hose there between, and upon said downstream portion filling, said foot is displaced upstream beyond said elbow to be thrown clear of said hose along said upstream slot links.

6. Structure according to claim 5 wherein said slots upstream of said elbows are substantially U-shaped, returning downward towards said casing floor to provide the upstream portion of said hose as a bumper for said clamp plate as it flies free of said hose.

7. Structure according to claim 5 wherein said slots are open at their upstream ends to release said plate from said casing.

8. An automatic hose clamp for engaging a hose, comprising:
  (a) a clamp assembly for said hose defining upstream and downstream portions adjacent thereto and being operable between a first position substantially restricting the flow of fluid through said hose and a second position substantially clear of said hose;
  (b) release means adjacent to the downstream portion of said hose and responsive to the expansive pressure of same as it changes from a flaccid to a turgid state to move said clamp assembly into its second position substantially clear of said hose to permit free fluid flow therethrough;
  (c) said clamp assembly including a casing defining a hose corridor and a clamp bar movable to compress said hose against said casing in said first position;
  (d) said bar being restrictively movably mounted in said casing such that expansive pressure from the upstream portion of said hose forces said bar more tightly against said hose, and expansive pressure from the downstream end of said hose forces said bar free of said hose;
  (e) means defining a pathway in said clamp assembly for said bar to travel in as it moves free of said hose, and further including a velocity damping breaking means engaging said bar as it moves free of said hose to limit the acceleration and velocity of same;
  (f) said braking means comprising a plate pivotal to said passageway to obstruct the mocement of said bar, said plate having means at the non-pivoted edge thereof to permit same to slowly recede away from said passageway to free said bar.

9. Structure according to claim 8 wherein said means to permit said braking means to recede comprises a pair of hydraulic cylinders with apperturted pistons.

10. An automatic hose clamp for engaging a hose comprising:
  (a) a clamp assembly for said hose defining upstream and downstream hose portions adjacent thereto and being operable between a first position substantially restricting the flow of fluid through said hose and a second position substantially clear of said hose;
  (b) release means adjacent to the downstream portion of said hose and responsive to the expansive pressure of same as it changes from a flaccid to a turgid state to move said clamp assembly into its second position substantially clear of said hose to permit free fluid flow there through; and,
  (c) said clamp assembly being openable to remove or lay in a hose length such that a hose may be clamped at any portion along its length without requiring hose threading from one end of the hose.

11. Structure according to claim 10 wherein said clamp assembly includes a casing defining a hose corridor and a clamp bar moveable to compress said hose against said casing in said first position, said clamp bar being openable to expose said hose corridor for removal or replacement of a hose length.

12. Structure according to claim 11 wherein said clamp bar is a separate piece from said casing and is completely removeable therefrom to expose said hose corridor.

* * * * *